US012784239B2

(12) United States Patent
Lu et al.

(10) Patent No.: US 12,784,239 B2
(45) Date of Patent: Nov. 3, 2026

(54) METHODS AND PROCESSORS FOR EXECUTING ADAPTIVE FRAME GENERATION

(71) Applicant: HUAWEI TECHNOLOGIES CO., LTD., Shenzhen (CN)

(72) Inventors: Shufang Lu, Markham (CA); Mohamed Ibrahim Hafez Ibrahim, Mississauga (CA); Yang Liu, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 328 days.

(21) Appl. No.: 18/406,902

(22) Filed: Jan. 8, 2024

(65) Prior Publication Data

US 2025/0225663 A1 Jul. 10, 2025

(51) Int. Cl.
*G06T 7/246* (2017.01)

(52) U.S. Cl.
CPC .... *G06T 7/248* (2017.01); *G06T 2207/10016* (2013.01); *G06T 2207/20084* (2013.01)

(58) Field of Classification Search
CPC ........... G06T 7/248; G06T 2207/10016; G06T 2207/20084; H04N 7/014
See application file for complete search history.

(56) References Cited

U.S. PATENT DOCUMENTS

2010/0302438 A1* 12/2010 Fujisawa ................ H04N 7/014 348/E7.003
2019/0138889 A1* 5/2019 Jiang .................... G06N 3/0455
2025/0106355 A1* 3/2025 Luo .......................... G06T 7/579

OTHER PUBLICATIONS

Hu et al.: "A Dynamic Multi-Scale Voxel Flow Network for Video Prediction", Arxiv.org Cornell University Library, submitted Mar. 17, 2023, [retrieved on Jan. 27, 2026]. Retrieved from the internet <https://arxiv.org/abs/2303.09875> (Year: 2023).*

* cited by examiner

*Primary Examiner* — Edward Park
*Assistant Examiner* — Alexander Joseph Vaughn
(74) *Attorney, Agent, or Firm* — BCF LLP

(57) ABSTRACT

A method and processor for real-time frame processing of a sequence of frames, focusing on motion vector determination, decision metric calculation, and selective triggering of modes for frame processing. It involves calculating motion vectors and their metrics based on pixel displacement and gradient magnitude between consecutive frames to decide on the most appropriate processing mode-copying, generating via neural networks, or rendering using GPUs. The method adapts over time by adjusting thresholds for motion vector metrics, employing decay functions to refine the decision-making process for subsequent frames. This adaptive approach aims to optimize frame generation and rendering quality in dynamic sequences, providing a sophisticated method for managing and enhancing visual media in real-time applications. The processor is configured to execute these steps, adjusting its operations as it processes more frames, ensuring efficient and high-quality visual outputs.

12 Claims, 5 Drawing Sheets

400

METHODS AND PROCESSORS FOR EXECUTING ADAPTIVE FRAME GENERATION

FIELD

The present technology relates generally to real-time graphics rendering, and more specifically, to methods and processors for adaptive frame generation in real-time graphics rendering.

BACKGROUND

Real-time graphic rendering techniques involve methods for generating and updating visual representations in dynamic scenarios, like gaming and simulations. These techniques often utilize Graphics Processing Units (GPUs) for parallel processing, and optimizing rendering through algorithms like rasterization and ray tracing.

In a gaming application, for example, the client interacts with the game using the input devices, the graphics engine receives user interactions, and sends the scene interaction information to the GPU hardware. The GPU renders the image of the 3D scene and sends it to the client for display. Therefore, traditional game rendering techniques are highly depending on GPU resource availability. Gaming experience depends on inter alia photorealistic rendering effects and high Frames Per Second (FPS) content. Generating photo-realistic rendering effects and high FPS content is a resource intensive task for GPU hardware.

At least some algorithms have been developed to boost performance by shifting some of the rendering workload from GPU hardware to Neural Processing Unit (NPU) software. Some algorithms aim to reduce the samples per pixel (SPP) in the ray tracing rendering process to decrease the rendering time, and then employ deep learning based denoising as a post processing step to provide high-quality visual results. Other algorithms cache radiance samples for later reuse by neural networks to provide multi-bounce illumination at the cost of tracing single rays or very short paths during the ray tracing process. Additional algorithms can render the image at a lower resolution, and then upscale it to the full resolution before display. Other algorithms aim to generate an entirely new frame to increase the frame rate.

Frame interpolation and frame extrapolation are two methods employed to generate new frames on the fly using previously rendered frames. Frame interpolation is more commonly used in which a new frame is generated in between two existing frames. Hence, it requires a future frame to be rendered first which delays the display of every rendered frame and introduces additional input latency, which degrades the overall performance.

Frame extrapolation predicts the new frame based on previously generated frames. Since frame extrapolation doesn't need information of future frames, it has lower latency compared to frame interpolation. However, since it is a trend-based approach for predicting what will happen in the future based on what has happened in the past, the generated frames can be unreliable and the quality is not guaranteed.

Frame generation methods which include both frame interpolation and frame extrapolation commonly adopt a fixed pattern to generate new frame. One example of such a fixed pattern frame generation method is NVIDIA'S DLSS 3 Frame Generation method disclosed in the article "*AI-Powered Performance Multiplier Boosts Frame Rates By Up To* 4×", authored by Lin, H & Burnes, A., published in 2022. It discloses an AI-powered graphics that generates every second frame. The DLSS Frame Generation convolutional autoencoder takes 4 inputs—current and prior game frames, an optical flow field generated by the previous and next frames, and game engine data such as motion vectors and depth. For each pixel, the DLSS Frame Generation AI network decides how to use information from the game motion vectors, the optical flow field, and the sequential game frames to create intermediate frames.

Another recent article is entitled "*Extranet: Real-time extrapolated rendering for low-latency temporal supersampling*" authored by Guo, J. et al., and published in 2021. It discloses a neural network that predicts shading results on an extrapolated frame with the help of a rendered auxiliary geometry buffers of the extrapolated frame and temporally motion vectors. Three historical frames are used as one of the inputs for neural network for frame extrapolation purpose.

Another recent article is entitled "*Kernel-Based Frame Interpolation for Spatio-Temporally Adaptive Rendering*", authored by Briedis, K. M., et. al., and published in 2021. It discloses a kernel-based frame interpolation method and proposes an strategy based on an implicit interpolation error prediction model. It aims to improve the frame interpolation quality while rendering the same number of pixels compared with fixed sequences. In this adaptive kernel-based frame interpolation, features extracted from auxiliary buffers are used to estimate implicit error maps, interpolation intervals and mask indicating regions need to be rendered.

SUMMARY

Developers have devised methods and devices for overcoming at least some drawbacks present in prior art solutions.

Although some conventional techniques may provide a steady rate of FPS boost, the error between the generated frame and its rendered ground truth varies depending on the speed of objects moving, camera pan, and the like. That is, these methods create new frames without considering the image quality of the generated frames. Furthermore, in many scenarios, the background of the scene is static, and there is very small change between frames. Therefore, the consecutive frames are quite similar to each other. In this case, if a fixed-pattern frame generation method is used, developers have realized that this may be time consuming to render every second frame.

At least some conventional techniques have a drawback of that they use a fixed frame generation technique which increases latency when a scene cut occurs. For example, when a scene cut happens between a first frame and a second frame, the fixed pattern method will generate a new frame that belongs to the previous old scene. Developers have realized that generating this frame and displaying it before the first frame of the new scene results in latency. Additionally, these fixed frame generation methods create new frames in bad quality when the scene changes a lot.

At least some conventional techniques may be suitable for offline rendering. For example, it may take ~0.30 s to estimate an implicit error map per single frame and interval, and 0.76 s to interpolate a single frame with 1920×804 resolution even on a powerful NVIDIA RTX A6000 GPU. Therefore, developers have realized that such techniques may not meet the requirements of real-time game rendering, in which the frame time should less than 0.03 s.

Developers of the present technology have realized that the quality of a displayed frame has a relationship with the motion vector of the scene. Developers have realized that in at least some cases there is a correlation between a decrease in frame display quality with an increase of the motion vector. In at least one broad aspect of the present technology, at the beginning of each frame, a "decision maker" algorithm decides whether to (i) copy, (ii) generate or (iii) render a frame depending on a metric that is computed from the motion vector to indicate the quality of the frame generation.

If the decision is to generate the frame, a computer device may use a frame extrapolation method to generate the frame. For example, the computer device may use a frame extrapolation method disclosed in an article entitled "A dynamic multi-scale voxel flow network for video prediction", authored by Hu et al., published in 2023 and the contents of which is incorporated herein by reference in its entirety. It is contemplated that the computer device may use two previous red-green-blue (RGB) color images as input to predict a frame.

It is contemplated that in some cases, the rendering workload may be redistributed between GPUs to NPUs for real-time graphics rendering purposes. In at least some embodiments, methods and devices disclosed herewith may increase the frame rate while improving the image quality of the generated frames. It should be noted that at least some embodiments of the present technology may be employed in combination with various algorithms that rely on frame generation to boost the frame rate while improving the quality of generated frames. At least some embodiments of the present technology may be executed by local game engine and/or cloud-based rendering platforms.

In the context of the present technology, "ray tracing" refers to a technique used to mimic the interaction of light rays with a 3D scene to produce a rendered image from a given point of view.

In the context of the present technology, "copying" refers to a technique where individual frames are duplicated from one sequence to another without modifying the original content. This is often used in video processing to maintain the temporal continuity of a video stream or to manipulate the video timeline, such as repeating specific frames to extend a scene or creating slow-motion effects by repeating frames.

In the context of the present technology, "generating" refers to the process of creating new frames where none existed before or altering existing frames to produce a new image. Frame generation might involve interpolating between existing frames to create smooth motion in slow-motion videos or using neural network to enhance or modify video content. The key aspect is the creation or significant alteration of frame content to produce a desired outcome that was not originally present.

In the context of the present technology, "rendering" refers to the process that takes a frame and adds a layer of complexity and detail, refining the image into its final form with greater visual depth and realism. While frame generation creates the content, rendering enhances and finalizes it with rich details and quality. Compared to generating a frame, rendering is a more computationally intensive task, as it involves the detailed and accurate portrayal of lighting, shading, textures, and effects to produce a high-fidelity visual representation of the frame. Rendering is typically performed through a Graphics Processing Unit (GPU).

In the context of the present technology, "photorealistic rendering" refers to Rendering techniques that generate lifelike images and animations using physically based virtual lights, cameras, and materials.

In the context of the present technology, "motion vector" refers to a motion field caused by the movement of camera and scene.

In the context of the present technology, "frame Interpolation" refers to a frame generation technique of synthesizing in-between images from a given set of images.

In the context of the present technology, "frame extrapolation" refers to a frame generation technique to predict future frames from the past (reference) frames.

In the context of the present technology, "convolutional autoencoder" refers to one of the unsupervised dimensionality reduction models composed by convolutional layers capable of creating compressed image representations.

In the context of the present technology, "optical flow" refers to a 2D vector field describing the apparent movement of each pixel from time-varying image intensity.

In the context of the present technology, "Deep Learning Super Sampling" (DLSS) refers to a family of real-time deep learning image enhancement that multiplies performance developed by NVIDIA.

In some embodiments, there is provided methods and processors for real-time motion-aware adaptive frame generation for increasing frame generation image quality while using relatively very low overhead computation. Our method relies on a motion-based predictor to select whether to copy, render, and/or to generate a given frame.

In at least one aspect of the present technology, there is provided a method for providing a current frame in a sequence of frames. The method is executable in real-time by a processor. The method comprises, at a current moment in time, determining a plurality of motion vectors for a current frame, the current frame including a plurality of pixels, a given motion vector from the plurality of motion vectors being a displacement of a given pixel between the current frame and an immediate predecessor frame; determining a motion vector metric based on the plurality of motion vectors. The motion vector metric is indicative of an extent of change between the current frame and the immediate predecessor frame. The method further comprises selectively triggering, based on the motion vector metric, one of: copying the immediate predecessor frame from the sequence of frames as the current frame; generating the current frame using a Neural Network (NN) based on the immediate predecessor frame; and rendering the current frame using a Graphical Processing Unit (GPU).

In some embodiments of the method, the determining the motion vector metric includes: determining a magnitude of each one of the plurality of motion vectors; determining a magnitude of a gradient of motion vectors between the current frame and the immediate predecessor frame; determining the motion vector metric based on a maximum amongst the magnitudes of each of the plurality of motion vectors and the magnitude of the gradient of the motion vectors.

In some embodiments of the method, the method further includes comparing the motion vector metric against one or more thresholds, and wherein the selectively triggering is executed based on the comparison between the motion vector metric and the one or more thresholds.

In some embodiments of the method, the method further includes selectively triggering one of: copying the immediate predecessor frame as the current frame if the motion vector metric is below a minimum threshold; generating the current frame using a Neural Network (NN) based on the immediate predecessor frame if the motion vector metric if above the minimum threshold and below a maximum threshold; rendering the current frame using a Graphical Processing Unit (GPU) if the motion vector metric is above the maximum threshold.

In some embodiments of the method, the method further includes, in response to generating the current frame, adjusting a given threshold amongst the one or more thresholds.

In some embodiments of the method, the adjusting includes employing a decay function to adjust a maximum motion vector threshold amongst the one or more thresholds based on a number of consecutive frames having been generated. The maximum motion vector threshold is indicative of the maximum allowable value of the metric for which a frame is generated instead of being rendered, thereby generating an adjusted maximum motion vector threshold. The adjusted maximum motion vector threshold is inferior to the maximum motion vector threshold.

In some embodiments of the method, the method further comprises, at a further moment in time being sequentially after the current moment in time, determining an additional plurality of motion vectors for an additional frame; determining an additional motion vector metric based on the comparing the other motion vector metric to the adjusted maximum motion vector threshold, instead of the maximum motion vector threshold; based on the comparison between the other motion vector metric to the adjusted maximum motion vector threshold, selectively triggering rendering of a further frame using the GPU, instead of generating the further frame using the NN.

In some embodiments of the method, the NN is a Dynamic Multiscale Voxel Flow Network (DMVFN) executable by the processor.

In at least one aspect of the present technology, there is provided a processor for providing a current frame in a sequence of frames. The processor is configured to, at a current moment in time, determine a plurality of motion vectors for a current frame, the current frame including a plurality of pixels, a given motion vector from the plurality of motion vectors being a displacement of a given pixel between the current frame and an immediate predecessor frame; determine a motion vector metric based on the plurality of motion vectors. The motion vector metric is indicative of an extent of change between the current frame and the immediate predecessor frame. The processor is further configured to selectively trigger, based on the motion vector metric, one of: copying the immediate predecessor frame from the sequence of frames as the current frame; generating the current frame using a Neural Network (NN) based on the immediate predecessor frame; and rendering the current frame using a Graphical Processing Unit (GPU).

In some embodiments of the processor, the determining the motion vector metric includes the processor being configured to: determine a magnitude of each one of the plurality of motion vectors; determine a magnitude of a gradient of motion vectors between the current frame and the immediate predecessor frame; determine the motion vector metric based on a maximum amongst the magnitudes of each of the plurality of motion vectors and the magnitude of the gradient of the motion vectors.

In some embodiments of the processor, the processor is further configured to compare the motion vector metric against one or more thresholds, and wherein the selectively triggering is executed based on the comparison between the motion vector metric and the one or more thresholds.

In some embodiments of the processor, the processor is further configured to selectively trigger one of: copying the immediate predecessor frame as the current frame if the motion vector metric is below a minimum threshold; generating the current frame using a Neural Network (NN) based on the immediate predecessor frame if the motion vector metric if above the minimum threshold and below a maximum threshold; rendering the current frame using a Graphical Processing Unit (GPU) if the motion vector metric is above the maximum threshold.

In some embodiments of the processor, the processor is further configured to, in response to generating the current frame, adjust a given threshold amongst the one or more thresholds.

In some embodiments of the processor, the adjusting by the processor includes employing a decay function to adjust a maximum motion vector threshold amongst the one or more thresholds based on a number of consecutive frames having been generated. The maximum motion vector threshold is indicative of the maximum allowable value of the metric for which a frame is generated instead of being rendered, thereby generating an adjusted maximum motion vector threshold. The adjusted maximum motion vector threshold is inferior to the maximum motion vector threshold.

In some embodiments of the processor, the processor is further configured to: determine, at a further moment in time being sequentially after the current moment in time, an additional plurality of motion vectors for an additional frame; determine an additional motion vector metric based on the comparing the other motion vector metric to the adjusted maximum motion vector threshold, instead of the maximum motion vector threshold; based on the comparison between the other motion vector metric to the adjusted maximum motion vector threshold, selectively trigger rendering of a further frame using the GPU, instead of generating the further frame using the NN.

In some embodiments of the processor, the processor is further configured to execute the NN using a Dynamic Multiscale Voxel Flow Network (DMVFN).

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
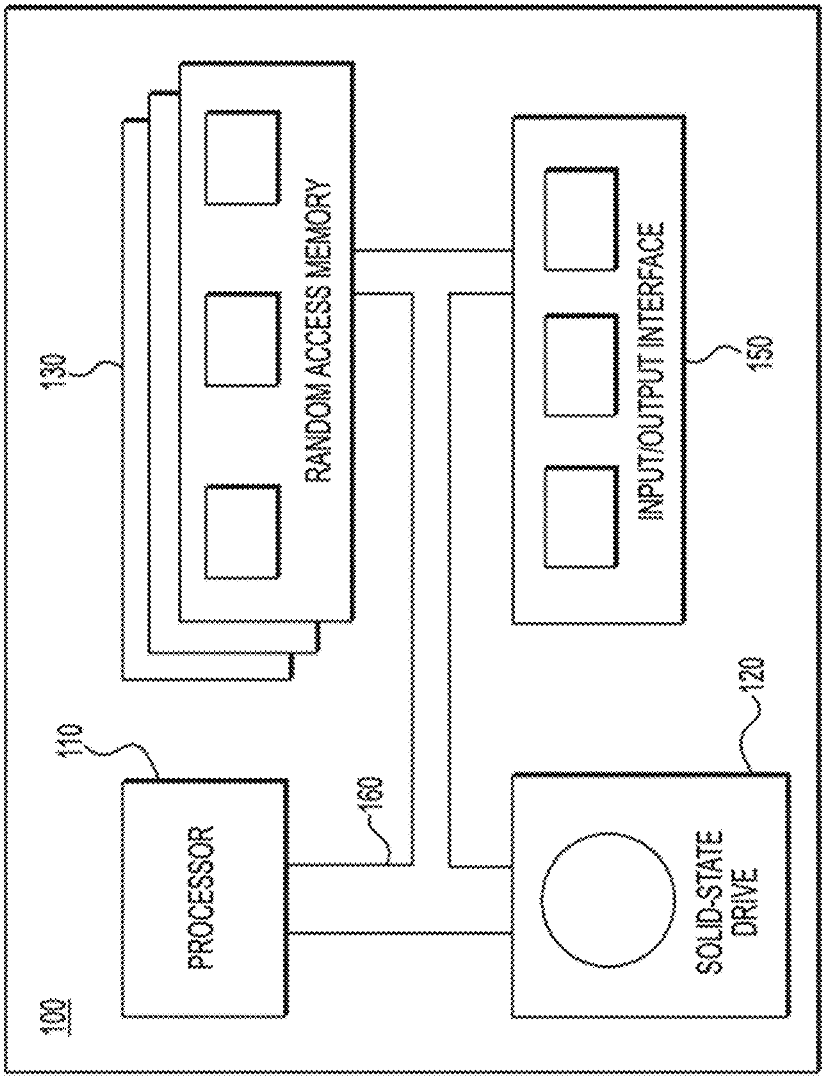
FIG. 1 illustrates an example of a computing device that may be used to implement any of the methods described herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates a diagram of a computing environment 100 in accordance with an embodiment of the present technology is shown. In some embodiments, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for executing operating data centers based on a generated machine learning pipeline. For example, the program instructions may be part of a library or an application.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (Saas). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

Figure 2:
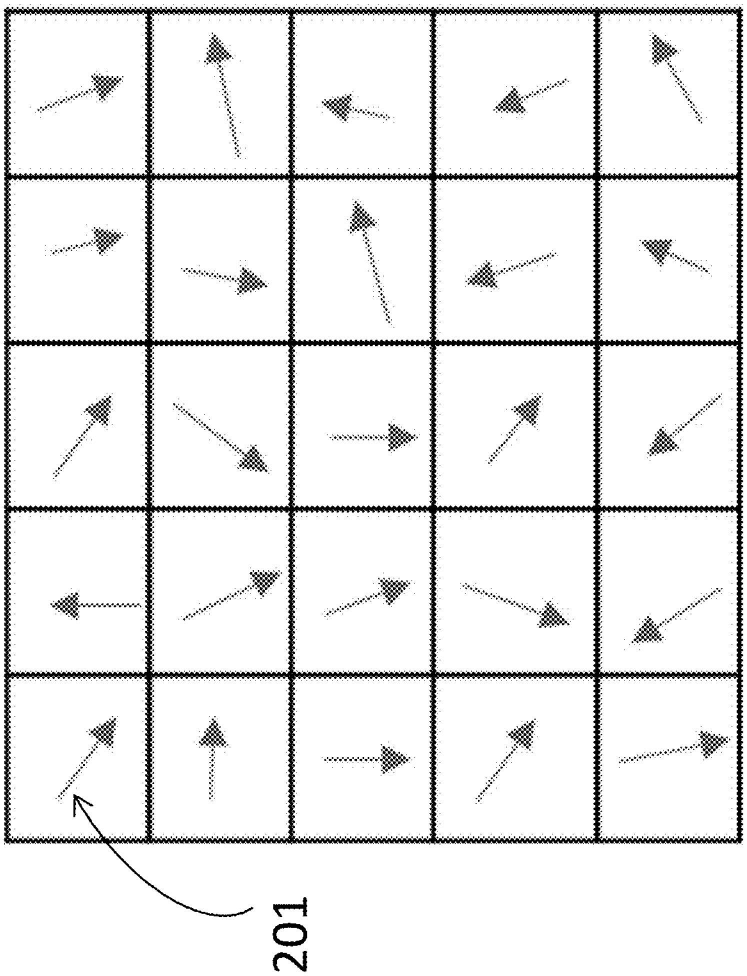
FIG. 2 is a schematic illustration of the concept of motion vectors.

FIG. 2 discloses a motion vector image 200 that contains the motion vectors for each pixel (for example, motion vector 201 for the pixel at the top-left corner) in a frame. The motion vector of a pixel represents how the pixel moves along the screen between the current frame and its immediate predecessor frame. It can be said that the motion vector represents a correspondence between a current pixel in its previous frame. That is, a motion vector represents the displacement of pixels between consecutive video frames, capturing motion information. The motion vectors for all the pixels in a frame together form the motion vector image of that frame.

For each frame $F_t$, after loading its corresponding motion vector image $mv^t$, the processor 110 may determine a magnitude $\|mv^t\|_2$ by computing magnitude of all pixels. For each pixel i, $x_i$ and $y_i$ represent the displacement in x and y directions from the pixel in current frame $F_t$ to corresponding pixel in previous frame $F_{t-1}$ and its motion vector magnitude is computed as:

$$\|mv_i^t\|_2 = \sqrt{(x_i^2 + y_i^2)} \tag{1}$$

In addition, the processor 110 may generate the gradient of the motion vector between current frame and previous frame. The gradient of the motion vector refers to the spatial rate of change of the motion vectors themselves. It is calculated by taking the derivative of the motion vectors across the image space. This means that for each pixel, the gradient indicates how much the motion vector changes with respect to the surrounding pixels. The magnitude of the gradient can be calculated in accordance with:

$$\|grad(mv^t)\|_2 = \|mv^t - mv^{t-1}\|_2 \tag{2}$$

Wherein $mv^t$ represents the motion vector image at time t, containing the motion vectors for all pixels at the current frame and $mv^{t-1}$ represents the motion vector image at the immediately previous moment (t−1), containing the motion vectors for all pixels at the immediate predecessor frame.

Next, the processor may computer the motion vector metric m by determining a maximum value between the magnitude of motion vector $\|mv^t\|_2$ and the magnitude of gradient of motion vector $\|grad(mv^t)\|_2$ in all pixels:

$$m = \max(\|mv_i^t\|_2, \|grad(mv^t)\|_2) \tag{3}$$

Figure 3:
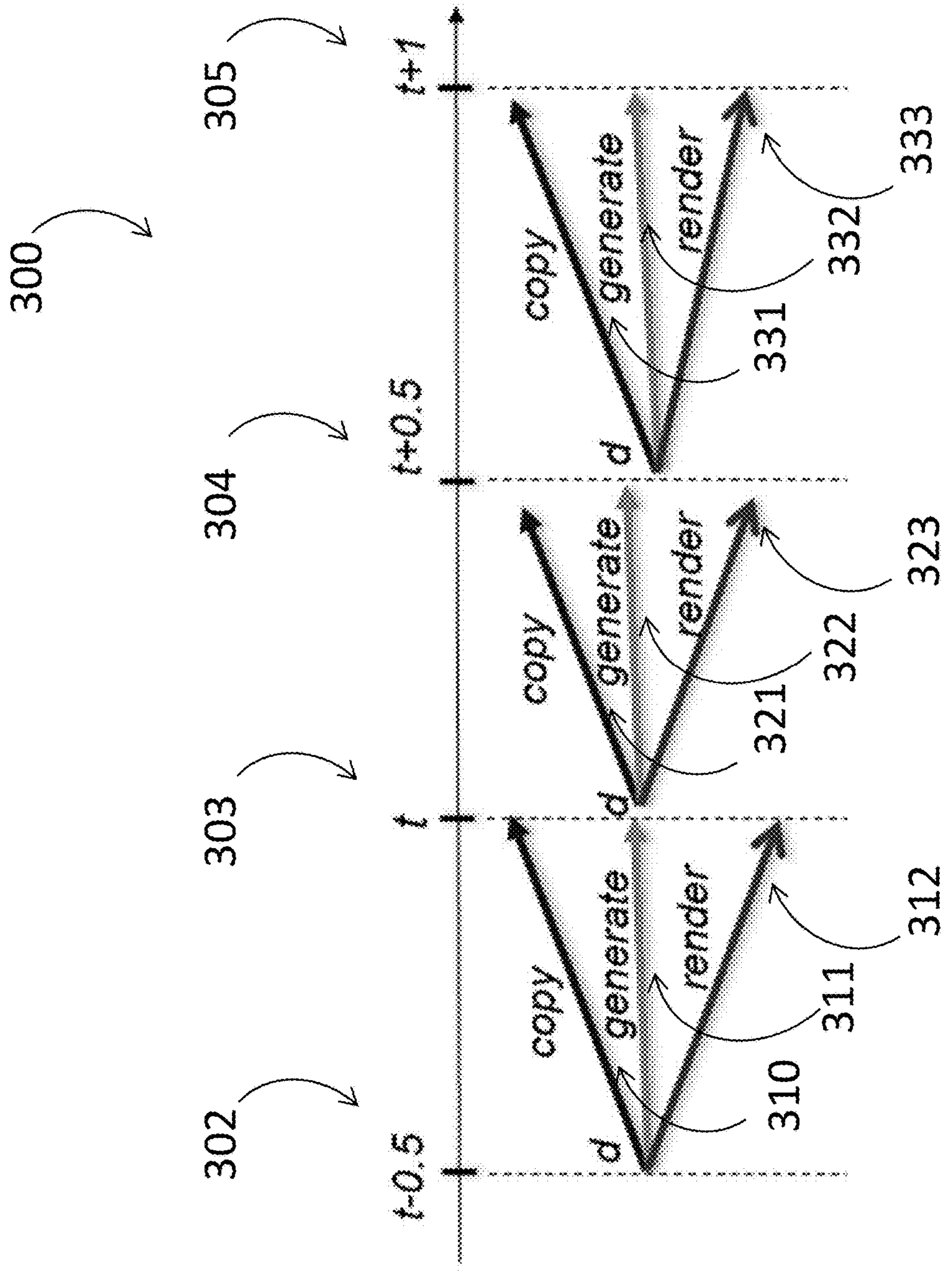
FIG. 3 is a schematic illustration of the proposed frame generation decision maker.

Once the motion vector metric m is generated at a given moment in time, the processor 110 may be configured to use the metric m in order to perform decision making on which action is to be triggered. For example, with reference to FIG. 3, there is depicted a process 300 regrading decision making executed by the processor 110 using motion metric values at different moments in time. In other words, the processor 110 may be configured to use the motion vector metric to decide whether to copy, generate or render a next frame at a given moment in time.

Since the motion vector gives an insight into the change of the scene, this information is leveraged to guide the frame generation process in order to produce high-quality frames with increasing frame rate. Specifically, with $mv_{min}$ and $mv_{max}$ as the minimum and maximum thresholds for the motion vector, the decision of whether the next frame is to be copied, generated or rendered may depend on a comparison between corresponding the motion vectors with thresholds:

$$d = \begin{cases} \text{copy}, & m \le mv_{min} \\ \text{generate}, & mv_{min} < m < mv_{max} \\ \text{render}, & m \ge mv_{max} \end{cases} \tag{4}$$

wherein the decision maker d is a function executable by the processor 110. It should be noted that the function in equation (4) can be replaced by other piecewise functions or even more sophisticated methods, such as reinforcement learning, without departing from the scope of the present technology.

For example, in cases where the scene is static and consecutive frames are the generally similar, the motion vector is less than the minimum motion vector threshold $mv_{min}$ and therefore, the processor 110 may trigger actions 310, 321, 331, which results in copying respective previous frames as the respective next frames.

In another example, in cases where a scene cut happens or the scene changes, the motion vector is greater than the maximum motion vector threshold $mv_{max}$ and therefore, the processor 110 may trigger actions 312, 323, 333, which results in rendering the respective next frames.

In a further example, in cases where the motion vector is less than the maximum motion vector threshold $mv_{max}$ and greater than the minimum motion vector threshold $mv_{min}$, the processor 110 may trigger actions 311, 322, 332, which results in generating the respective next frames.

In some embodiments of the present technology, it is contemplated that the processor 110 may be configured to determine which action, amongst copying, rendering, or generating, is to be triggered at a given moment in time. For example, at each one of the moments 302, 303, 304, and 305, the processor 110 may be configured to compute a motion vector metric value considering the current frame and its immediate predecessor and perform the decision on which action is to be triggered at least in part based on the respective motion vector metric value. As a result, the processor 110 may trigger different action sequences for the moments in time 302, 303, 304, and 305. For example, when playing a game, a user may repeatedly consult a map during moments 302, 303, and 304. Given the map's relative static nature, the processor 110 copies the frame from moment 302 for moments 303 and 304 to conserve resources. Conversely, if the user controls a dinosaur engaged in active hunting during the moments 302, 303 and 304, the dynamic scene necessitates rendering new frames for each moment due to the significant visual changes. Subsequently, at moment 305, as the dinosaur begins to rest and the scene stabilizes, the processor 110 will generate the frame for moment 305, reflecting the reduced activity.

If the decision is to render a frame, the processor 110 can choose from a number of currently known rendering methods, for example, rasterization, ray tracing, hybrid rendering etc. Rasterization is a process of rasterizing 3D models onto a 2D plane for display on a computer screen. This process is often carried out by fixed function hardware within the graphics pipeline. At least one advantage of rasterization is its speed, compared with ray tracing. However, rasterization cannot take shading, or the physical light into account and it cannot promise to get a photorealistic output. In order to realistically simulate the lighting of a scene and its objects while rendering, the processor 110 can employ ray tracing by capturing physically accurate reflections, refractions, shadows, and indirect lighting. Ray tracing is comparatively more time-consuming but provides better quality for each frame. The processor 110 can also employ a hybrid rendering pipeline in which rasterization and ray tracing work together to enable real-time high-quality rendering.

If the decision is to generate a frame, the processor 110 can choose from a number of currently known frame generation methods, for example, image warping and artificial-intelligence-based methods such as dynamic multi-scale voxel flow network (DMVFN).

The decision-maker-based approach in at least some embodiments of the present technology is in contrary to a fixed frame generation method where a predetermined sequence of actions would be implemented irrespective of the degree of change between successive frames. For example, in a fixed frame generation method, frames might be alternately rendered and generated-such that if the frame at moment 302 is rendered, the subsequent frames at moments 303, 304, and 305 would be sequentially processed through generation, rendering, and generation. Such fixed patterns lack the flexibility required to optimize resource utilization, suffer from high latency and have limited performance capabilities in processing scenes having complex changes, detailed textures and lighting. The decision-maker-based approach implemented in the present technology uses the motion vector metric value calculated by the processor 110 by comparing the frames at each pair of moments (e.g., 303 and 304) to quantify the variations between two successive frames of the scene. This assessment then informs the decision on whether to copy, render, or generate the current frame. Hence, depending on the variation in successive frames, the sequence of operation can have many possibilities, for example, copy-render-generate, copy-generate-generate, generate-copy-generate etc. Thus, instead of adhering to a one-size-fits-all approach, the processor 110 allocates resources more efficiently, focusing on copying, rendering or generating a frame depending on the variation observed between the current frame and its immediate predecessor, as indicated by the value of the motion vector calculated for this pair of frames. Thus, the decision-maker-based approach reduces unnecessary computational load, lowers latency and power consumption. Furthermore, by rendering frames when significant movement or change is detected, the system ensures that high-quality, detailed frames are displayed during the most important moments, while less resource-intensive processing is used when the scene is static or less complex. Moreover, this approach is more adaptable for systems with different types of hardware capabilities. It can scale up to provide more instances of high-quality rendering for complex scenes on powerful systems, or scale down to focus on more basic frame generation or copying on less capable devices, all while maintaining the best possible performance and quality.

Figure 4:
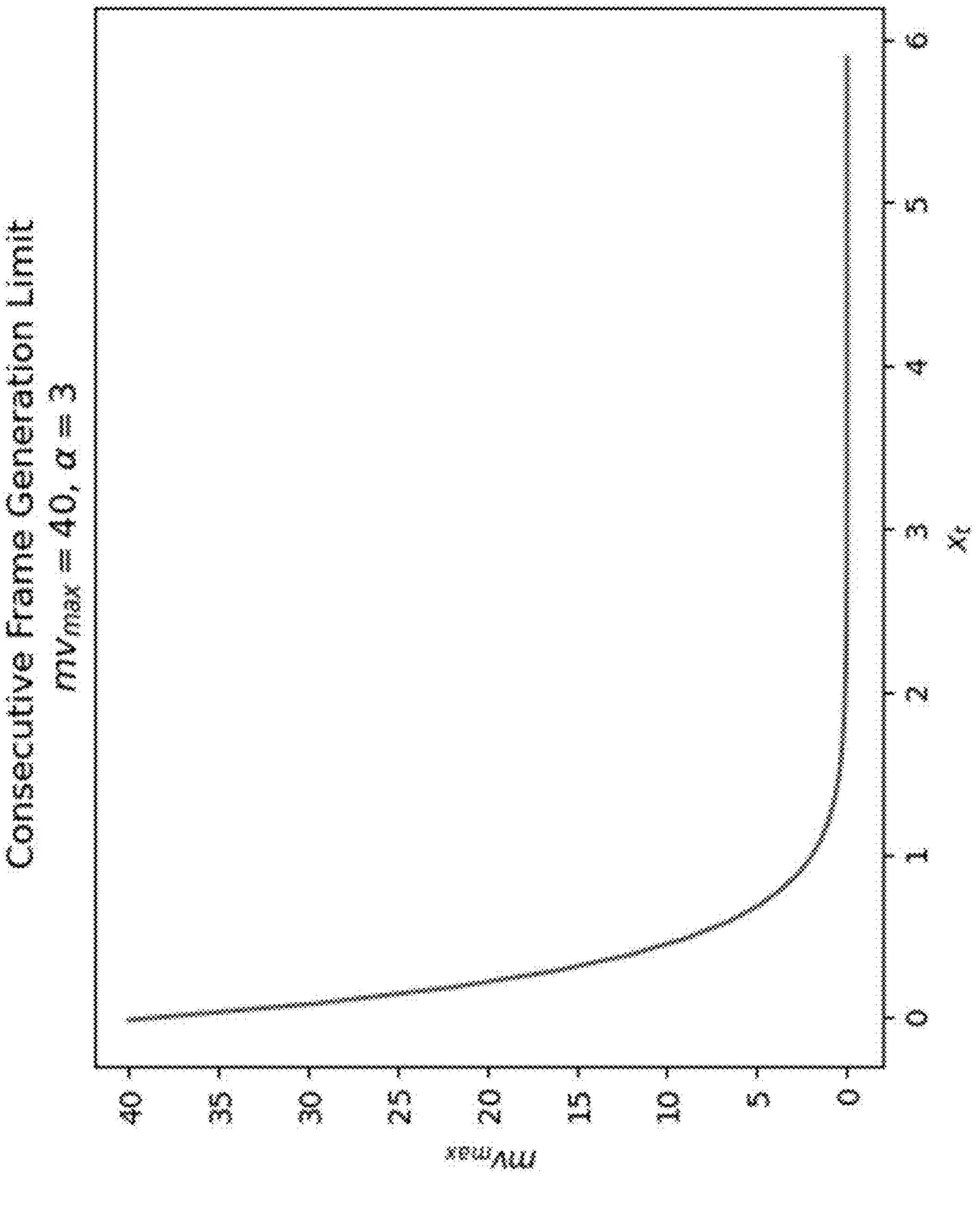
FIG. 4 is a graphical representation of a motion vector threshold decay mode.

In some embodiments, the processor 110 may operate under a decay mode of operation. For example, with reference to FIG. 4 there is depicted a graphical representation of an effect of a decay mode applied to the motion vector threshold. It can be said that the processor 110 operation in a decay mode may limit a number of consecutive frame generation actions that are executed and therefore may allow controlling the quality of next frame(s). In some embodiments, the maximum motion vector threshold $$mv^t_{max}$$

for a current frame $F_t$ may depend on a number of consecutive generated frames and a decay weight:

$$mv^t_{max} = mv_{max} * e^{-\alpha x^t} \tag{5}$$

wherein, $\alpha$ is a weight and $x^t$ represents the number of consecutive generated frames, which is set to 0 once a next frame is a rendered frame. Thus, the processor 110 uses decay mode to address the issue of prolonged frame generation leading to decreased image quality by dynamically adjusting the maximum motion vector threshold based on the number of consecutive generated frames. By reducing this threshold with each additional generated frame, the system is more likely to switch to rendering, thus maintaining image quality. The decay mode effectively balances the need for computational efficiency with the requirement for high-quality rendering, ensuring that image quality does not degrade over time even when operating under constraints. It should be noted that the exponential function in equation (5) can be replaced by linear, logarithmic, polynomial or any other non-linear function, without departing from the scope of the present technology.

In some embodiments, a dynamic multi-scale voxel flow network (DMVFN) may be employed for a video prediction method using real-time frame extrapolation. DMVFN is disclosed in the article "A Dynamic Multi-Scale Voxel Flow Network for Video Prediction", authored by Xiaotao, Hu et al., published in 2023, the contents of which is incorporated herein by reference in its entirety. DMVFN models the complex motion cues of diverse scales between adjacent frames by dynamic optical flow estimation. It is comprised of several Multi-scale Voxel Flow Blocks (MVFBs), which are stacked in a sequential manner. On top of MVFBs, a light-weight Routing Module adaptively generates a routing vector according to the input frames, and dynamically selects a subnetwork for efficient future frame prediction. The RGB color images of frame $F_{t-2}$ and $F_{t-1}$ are used as the inputs for the DMVFN to output the predicted frame $F_t$. The thresholds can be used as a knob to balance between the frame generation quality and speed.

In some embodiments, for maintaining the resource budget, if the frame rendering time of a scene is less than the cost taken by DMVFN frame generation method, the frame is rendered without considering the motion vector. For example, with reference to FIG. 3, if the required frame rendering time at moment 304 is less than the cost taken by DMVFN frame generation method, the frame at moment 304 would be rendered by the processor 110 regardless of the value of the motion vector.

Figure 5:
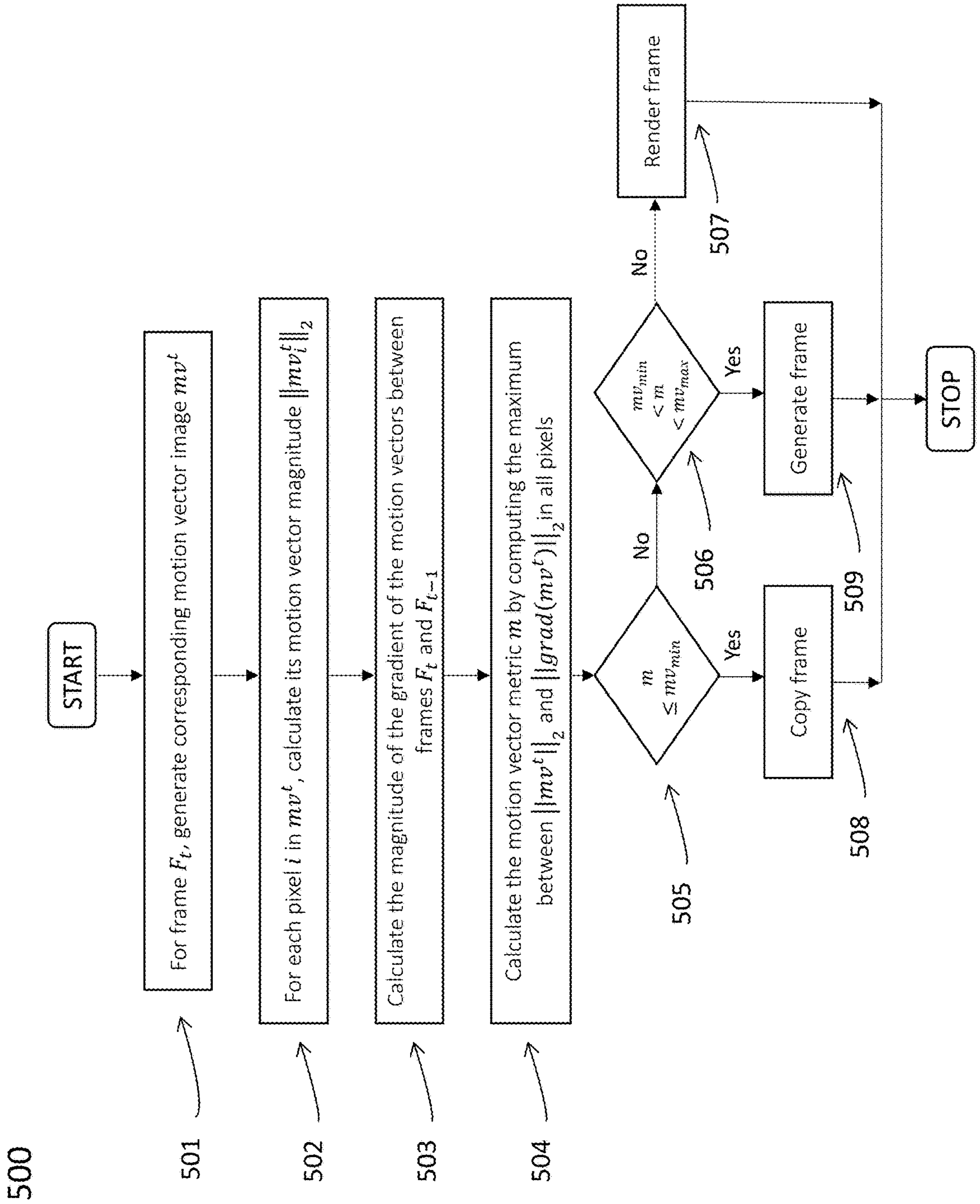
FIG. 5 is a scheme-block illustration of a method executed by a processor of the computing device of FIG. 1, in accordance with at least some non-limiting embodiments of the present technology.

FIG. 5 is a flow diagram of a method 500 for adaptive frame generation in real-time graphics rendering using motion vector thresholds according to some implementations of the present technology. In one or more aspects, the method 500 or one or more steps thereof may be performed by the processor 110 of the computer system 100. The method 500 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 500 begins at operation 501 with generating a motion vector image (for example, the motion vector image 200 in FIG. 2) containing motion vectors (for example, the motion vector 201 in FIG. 2) for each pixel in the current frame by comparing how each pixel of the current frame moves along the screen compared to the corresponding pixels in the immediate predecessor frame.

The method 500 continues with calculating, at operation 502, the motion vector magnitude for each pixel in the motion vector image of the current frame. The higher the change in the pixels between two successive frames, the higher is the motion vector magnitude.

The method 500 continues with calculating, at operation 503, the magnitude of the gradient of the motion vectors between the current frame and its immediate predecessor frame. A higher value of the gradient indicates a higher degree of change between two successive frames.

The method 500 continues with calculating, at operation 504, the motion vector metric for the current frame by computing the maximum between its motion vector magnitudes and the magnitude of the gradient with respect to the immediate predecessor frame.

The method 500 continues with deciding, at operation 505, whether the motion vector metric is below a minimum threshold.

If the decision at operation 505 is positive, the method 500 continues to copy the immediate predecessor frame and display it as the current frame at operation 508. For example, with reference to FIG. 3, at moment 303, if the motion vector metric is below the minimum threshold, the decision d for obtaining the frame at moment 303 would be 310, i.e., to copy the frame from moment 302.

If the decision at operation 505 is negative, the method 500 continues with deciding, at operation 506, whether the motion vector metric is above a minimum threshold and below a maximum threshold.

If the decision at operation 506 is positive, the method 500 continues to generate a new frame for the current moment at operation 509. For example, with reference to FIG. 3, at moment 304, if the motion vector metric is above the minimum threshold and below a maximum threshold, the decision d for obtaining the frame at moment 304 would be 322, i.e., to generate a new frame for moment 304.

If the decision at operation 506 is negative, the method 500 continues to render the frame for the current moment at operation 507. For example, with reference to FIG. 3, at moment 305, if the motion vector metric is above the maximum threshold, the decision d for obtaining the frame at moment 305 would be 333, i.e., to render a new frame for moment 305. The first frame in the sequence may be rendered since there is no motion vector.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It will be appreciated that at least some of the operations of the method 600 may also be performed by computer programs, which may exist in a variety of forms, both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for providing a current frame in a sequence of frames, the method executable in real-time by a processor, the method comprising:

at a current moment in time:

determining a plurality of motion vectors for a current frame, the current frame including a plurality of pixels, a given motion vector from the plurality of motion vectors being a displacement of a given pixel between the current frame and an immediate predecessor frame;

determining a motion vector metric based on the plurality of motion vectors, the motion vector metric being indicative of an extent of change between the current frame and the immediate predecessor frame;

comparing the motion vector metric against one or more thresholds:

selectively triggering, based on the motion vector metric, one of:

copying the immediate predecessor frame from the sequence of frames as the current frame if the motion vector metric is below a minimum threshold;

generating the current frame using a Neural Network (NN) based on the immediate predecessor frame if the motion vector metric is above the minimum threshold and below a maximum threshold; and rendering the current frame using a Graphical Processing Unit (GPU) if the motion vector metric is above the maximum threshold.

2. The method of claim 1, wherein the determining the motion vector metric includes:

determining a magnitude of each one of the plurality of motion vectors;

determining a magnitude of a gradient of motion vectors between the current frame and the immediate predecessor frame;

determining the motion vector metric based on a maximum amongst the magnitudes of each of the plurality of motion vectors and the magnitude of the gradient of the motion vectors.

3. The method of claim 1, wherein the method further includes:

in response to generating the current frame, adjusting a given threshold amongst the one or more thresholds.

4. The method of claim 3, wherein the adjusting includes:

employing a decay function to adjust a maximum motion vector threshold amongst the one or more thresholds based on a number of consecutive frames having been generated, the maximum motion vector threshold being indicative of a maximum allowable value of the metric for which a frame is generated instead of being rendered, thereby generating an adjusted maximum motion vector threshold, the adjusted maximum motion vector threshold being inferior to the maximum motion vector threshold.

5. The method of claim 4, wherein the method further comprises:

at a further moment in time being sequentially after the current moment in time:

determining an additional plurality of motion vectors for an additional frame;

determining an additional motion vector metric based on the additional plurality of motion vectors;

comparing the additional motion vector metric to the adjusted maximum motion vector threshold, instead of the maximum motion vector threshold;

based on the comparison between the additional motion vector metric to the adjusted maximum motion vector threshold, selectively triggering rendering of a further frame using the GPU, instead of generating the further frame using the NN.

6. The method of claim 1, wherein the NN is a Dynamic Multiscale Voxel Flow Network (DMVFN) executable by the processor.

7. A processor for providing a current frame in a sequence of frames, the processor being configured to:

at a current moment in time:

determine a plurality of motion vectors for a current frame, the current frame including a plurality of pixels, a given motion vector from the plurality of motion vectors being a displacement of a given pixel between the current frame and an immediate predecessor frame;

determine a motion vector metric based on the plurality of motion vectors, the motion vector metric being indicative of an extent of change between the current frame and the immediate predecessor frame;

compare the motion vector metric against one or more thresholds:

selectively trigger, based on the motion vector metric, one of:

copying the immediate predecessor frame from the sequence of frames as the current frame if the motion vector metric is below a minimum threshold;

generating the current frame using a Neural Network (NN) based on the immediate predecessor frame if the motion vector metric is above the minimum threshold and below a maximum threshold; and rendering the current frame using a Graphical Processing Unit (GPU) if the motion vector metric is above the maximum threshold.

8. The processor of claim 7, wherein the determining the motion vector metric includes the processor being configured to:

determine a magnitude of each one of the plurality of motion vectors;

determine a magnitude of a gradient of motion vectors between the current frame and the immediate predecessor frame;

determine the motion vector metric based on a maximum amongst the magnitudes of each of the plurality of motion vectors and the magnitude of the gradient of the motion vectors.

9. The processor of claim 7, wherein the processor is further configured to:

in response to generating the current frame, adjust a given threshold amongst the one or more thresholds.

10. The processor of claim 9, wherein the adjusting by the processor includes:

employing a decay function to adjust a maximum motion vector threshold amongst the one or more thresholds based on a number of consecutive frames having been generated, the maximum motion vector threshold being indicative of a maximum allowable value of the metric for which a frame is generated instead of being rendered, thereby generating an adjusted maximum motion vector threshold, the adjusted maximum motion vector threshold being inferior to the maximum motion vector threshold.

11. The processor of claim 10, wherein the processor is further configured to:

at a further moment in time being sequentially after the current moment in time:

determine an additional plurality of motion vectors for an additional frame;

determine an additional motion vector metric based on the additional plurality of motion vectors;

compare the additional motion vector metric to the adjusted maximum motion vector threshold, instead of the maximum motion vector threshold;

based on the comparison between the additional motion vector metric to the adjusted maximum motion vector threshold, selectively trigger rendering of a further frame using the GPU, instead of generating the further frame using the NN.

12. The processor of claim 7, wherein the processor is further configured to execute the NN using a Dynamic Multiscale Voxel Flow Network (DMVFN).

* * * * *